(12) United States Patent
Günther

(10) Patent No.: US 11,708,040 B2
(45) Date of Patent: Jul. 25, 2023

(54) ENERGY ABSORPTION COMPONENT AND BUMPER CROSSMEMBER COMPRISING SUCH AN ENERGY ABSORPTION COMPONENT

(71) Applicant: KIRCHHOFF AUTOMOTIVE DEUTSCHLAND GMBH, Attendorn (DE)

(72) Inventor: Alexander Günther, Olpe (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 208 days.

(21) Appl. No.: 17/293,698

(22) PCT Filed: Dec. 17, 2019

(86) PCT No.: PCT/EP2019/085510
§ 371 (c)(1),
(2) Date: May 13, 2021

(87) PCT Pub. No.: WO2020/127169
PCT Pub. Date: Jun. 25, 2020

(65) Prior Publication Data
US 2022/0009435 A1    Jan. 13, 2022

(30) Foreign Application Priority Data
Dec. 18, 2018 (DE) ...................... 10 2018 132 591.6

(51) Int. Cl.
*B60R 19/34* (2006.01)
(52) U.S. Cl.
CPC ................. *B60R 19/34* (2013.01)
(58) Field of Classification Search
CPC ................. B60R 19/18; B60R 19/34
(Continued)

(56) References Cited

U.S. PATENT DOCUMENTS

| 4,830,416 A | 5/1989 | Matsuoka |
| 8,950,794 B2 | 2/2015 | Lenkenhoff |

(Continued)

FOREIGN PATENT DOCUMENTS

| DE | 19511868 A1 | 10/1996 |
| DE | 10359483 A1 | 7/2005 |

(Continued)

OTHER PUBLICATIONS

International Search Report dated Jun. 25, 2020 in parent International application PCT/EP2019/085510.

(Continued)

*Primary Examiner* — Pinel E Romain
(74) *Attorney, Agent, or Firm* — Polson Intellectual Property Law, PC; Margaret Polson; Christopher Sylvain

(57) ABSTRACT

An energy absorption component for a motor vehicle, comprising a connection component and a crash box formed by a top chord, a bottom chord, and two side chords spaced apart from one another and connecting the top chord to the bottom chord. One end of the crash box is designed for connection to a bumper crossmember. The other end of the crash box rests against the connection component and is welded to it. The connection component has at least one flange portion which rests against a side chord of the crash box and is connected thereto by a welded joint, wherein this welded joint is spaced apart from adjacent welded joints, which connect the connection component to the top and bottom chords of the crash box, in the direction of the longitudinal extent of the crash box.

12 Claims, 5 Drawing Sheets

(58) Field of Classification Search
USPC .......................................................... 293/133
See application file for complete search history.

(56) References Cited

U.S. PATENT DOCUMENTS

| | | | |
|---|---|---|---|
| 9,446,799 B2 | 9/2016 | Franzpötter | |
| 9,586,545 B2 * | 3/2017 | Kibben | B60R 19/12 |
| 9,598,100 B2 | 3/2017 | Lenkenhoff | |
| 9,764,764 B2 | 9/2017 | Irle | |
| 10,005,495 B2 | 6/2018 | Töller | |
| 10,183,321 B2 * | 1/2019 | Kim | B60D 1/565 |
| 10,577,025 B2 | 3/2020 | Michler | |
| 10,882,559 B2 | 1/2021 | Gündogan | |
| 2019/0344385 A1 | 11/2019 | Töller | |
| 2020/0231107 A1 | 7/2020 | Günther | |
| 2020/0254948 A1 | 8/2020 | Töller | |
| 2020/0317149 A1 | 10/2020 | Höning | |
| 2020/0398895 A1 | 12/2020 | Günther | |

FOREIGN PATENT DOCUMENTS

| | | |
|---|---|---|
| DE | 202008017596 U1 | 3/2010 |
| DE | 102010050013 A1 | 5/2012 |
| DE | 102009005606 B9 | 1/2013 |
| DE | 102013200073 A1 | 3/2014 |
| DE | 102015101435 B3 | 7/2016 |
| EP | 1182095 A1 | 2/2002 |
| EP | 1588079 A2 | 9/2005 |
| EP | 2431234 A1 | 3/2012 |
| EP | 2599668 A2 | 6/2013 |
| JP | 2003312404 A | 11/2003 |
| WO | 2006036065 A1 | 4/2006 |
| WO | 2012127417 A1 | 9/2012 |

OTHER PUBLICATIONS

Written Opinion of the International Searching Authority dated Jun. 25, 2020 in parent International application PCT/EP2019/085510.
U.S. Appl. No. 17/259,894, filed Jan. 12, 2021. Per rule 609.07.

* cited by examiner

ENERGY ABSORPTION COMPONENT AND BUMPER CROSSMEMBER COMPRISING SUCH AN ENERGY ABSORPTION COMPONENT

BACKGROUND

The present disclosure relates to an energy absorption component for a motor vehicle, comprising a connection component and a crash box formed by a top chord, a bottom chord and two side chords spaced apart from one another and connecting the top chord to the bottom chord, wherein one end of the crash box is designed for a connection to a bumper crossmember, and the other end of the crash box rests against the connection component and is welded to it. The present disclosure further relates to a bumper crossmember comprising such an energy absorption component.

Energy absorption components are used for the absorption of kinetic energy acting on a bumper of a motor vehicle in the case of an accident, in order to protect the vehicle compartment and thus the vehicle passengers as well as possible. For this purpose, such an energy absorption component has a crash box which is connected by one end thereof to a bumper crossmember and by the other end thereof on the vehicle side to a longitudinal member. For the connection to the longitudinal member, the crash box is connected to a connection component, typically a mounting plate, a so-called base plate. The crash box rests by its front side against the mounting plate and is peripherally welded to it. The crash boxes are used for energy absorption in the case of an accident, wherein the impact energy is used for energy dissipation by reforming of such a crash box in accordance with the intended use for energy reduction absorption. Typically, crash boxes are designed so that, for this energy absorption, they are compressed in the manner of an accordion or bellows. For the energy absorption according to the intended use, it is necessary that the energy absorption component and thus the connection of crash box and connection components, that is to say, for example, of the mounting plate, are maintained.

Vehicle crashes are simulated by the European New Car Assessment Program (Euro NCAP) in order to classify new cars with regard to their traffic safety. In the context of this test, among others, the so-called full width frontal crash is carried out, in which the vehicle impacts a rigid barrier at a speed of 50 km/h and 100% overlap. In such tests it has been shown that a previously known energy absorption component formed by a crash box, the end of which rests on the front side against a mounting plate connected to a longitudinal member and is welded thereto, sometimes represents a weak point in the crash management system, in particular if the crash box is made of an aluminum alloy. This circumstance is explained by the fact that, in the above-described full width frontal crash, a force acts centrally on the bumper crossmember, whereupon a force acts on the crash box connected to the bumper crossmember in the direction of the center of the bumper crossmember. As a result, notably, the side chords facing in transverse direction of the vehicle are exposed to a tensile force. Therefore, these side chords sometimes represent a weak point of such an energy absorption component and, under a load, they tend to crack.

SUMMARY

Proceeding om this background, an aspect of the present disclosure is to develop an energy absorption component of the type mentioned at the beginning, so that the aforementioned cracking on the side chord of the crash box can be effectively avoided and thus the crash performance of such an energy absorption component and consequently the bumper crossmember system are considerably improved.

This is achieved by an energy absorption component of the type mentioned at the beginning, in which the connection component has at least one flange portion which rests against a side chord of the crash box and is connected thereto by a welded joint, wherein this welded joint is spaced apart from the adjacent welded joints, which connect the connection component to the top and bottom chords of the crash box, in the direction of the longitudinal extent of the crash box.

In this energy absorption component, the connection component has a flange portion which rests against a side chord of the crash box. This design creates the possibility that the crash box can be connected to the connection component by welds spaced apart from one another in longitudinal extent of the crash box. The top chord and the bottom chord can be welded to the connection component by their front side ends, for example, by means of a fillet weld. The flange portion offers the possibility of welding the connection component to the crash box on this side chord spaced apart from the adjacent welded joints of top chord and bottom chord to the connection component. By this measure, it is achieved that the heat influence zone introduced through the respective weld into the respective chord of the crash box between side chord and top chord or between side chord and bottom chord is no longer continuous, at least not sufficiently continuous for the mechanical strength values of the material of the crash box to be reduced by such a heat influence. The spacing of the welded joints in the direction of the longitudinal extent of the crash box between top chord and bottom chord and the connection component, on the one hand, and the at least one side chord and the connection component, on the other hand, is preferably sufficiently large so that the respective introduced heat influence zones, which result in a considerable reduction of the mechanical strength properties, do not transition into one another. As a result of this, cracking can be prevented even with higher tensile loads acting on a side chord, since, in contrast to the prior art, no peripheral heat influence zone with lowered mechanical strength values is present. In addition, the spacing has the result that the heat influence zone, which in the prior art was particularly large in the transition from a side chord into the top chord or into the bottom chord due to the peripheral welding in the edge region of the crash box so that crack initiation proceeding from the edge region of the crash box was increasingly observed, is no greater in this region than in the other sections of the crash box. In the energy absorption component according to the present disclosure, the welds, which connect the crash box to the connection component, end before the edges that transition between adjacent chords. However, typically, these welds extend up to the edge, in order to be able to establish the longest possible welded joint between each chord and the connection component.

According to an embodiment of this energy absorption component, the connection component is a mounting plate, a so-called base plate, against which the crash box rests or is braced by its ends facing away from the bumper crossmember. Due to the at least one flange portion brought up to or resting against a side chord, the base surface area of the mounting plate is reduced. In such an embodiment, this flange portion is typically part of a peripheral flange bent in the direction of the bumper crossmember side end of the crash box. In a preferred embodiment, the flange portion connected to the at least one side chord has a greater extent in the direction of the longitudinal extent of the crash box than the adjacent flange portions into which the flange portion connected to the side chord transitions. The flange portions of such a peripheral flange that do not rest against a side chord are used to increase the stiffness of the mounting plate. In order to achieve this, a relatively small flange height is already sufficient.

The height of the flange portion resting against the side chord and welded to it, and thus the size of the spacing in the direction of the longitudinal extent of the cash box from the adjacent welds between top chord and bottom chord and the connection component can be adjusted to the respective application case. The height of the flange portion and thus the amount of the aforementioned spacing will also be designed depending on the heat input expected during the welding. In addition, as a result of this measure, there exists the possibility of influencing the stress behavior in the event of a crash. This is achieved via the selection of the height of the flange portion. Additionally, the stress behavior can also be set via the design of the end contour of this flange portion on which the weld for the connection of the flange portion to the side chord typically extends. Such a contour can have, for example, a concave or convex curvature extending over the width of the side chord or over the corresponding extent of the flange portion.

Typically, the at least one side chord which is connected to the flange portion of the connection component faces outward in transverse direction with respect to the longitudinal axis of the bumper crossmember on which the crash box is arranged, and thus represents the outer side chord of the crash box. In a frontal crash, the outer side chord is generally exposed more strongly to a tensile stress, since the force, which, in the event of a frontal crash, is generally applied centrally on a bumper crossmember comprising energy absorption components correspondingly arranged on the right and left sides, involves a tensile stress of the energy absorption components directed toward the center of the bumper crossmember.

According to an embodiment example, the crash box is produced from a suitable aluminum alloy, typically by an extrusion method. The crash box is a hollow chamber profile which can certainly also be designed with multiple chambers. The connection component as well can be an aluminum component, in particular if it is implemented as mounting plate. It is understood that other materials such as steel, for example, can also be used to form the crash box or the entire energy absorption component and a hybrid design can be used as well.

For a particularly precise and qualitatively high-value generation of the welded joints to be implemented for such an energy absorption component, all the welds are implemented as laser welds. However, in order to generate the largest possible connection area, at this point, at least partial formation of the welds by MIG welding, or a combination of different welding methods, is also possible.

As connection component, instead of a mounting plate, a longitudinal member component of a motor vehicle can also be used. In such an embodiment, the crash box is braced by its front side against the front side of such a longitudinal member component. The longitudinal member component, on at least one wall thereof adjoining at least a side chord, has an extension as flange portion overlapping a side chord of the crash box.

In a development of an energy absorption component, as described above, it is provided that a respective flange portion of the connection component rests against both side chords of the crash box and is connected thereto by a welded joint, wherein the welds on both side chords are spaced apart in the longitudinal direction of the crash box in the above-described amount from the welded joints by which the top chord and the bottom chord are connected to the connection component. In such an embodiment, the height and/or end contour of the flange portion can be different on the two side chords.

BRIEF DESCRIPTION OF THE DRAWINGS

The following description is provided using example embodiments in reference to the appended figures, wherein.

DETAILED DESCRIPTION

Figure 1:
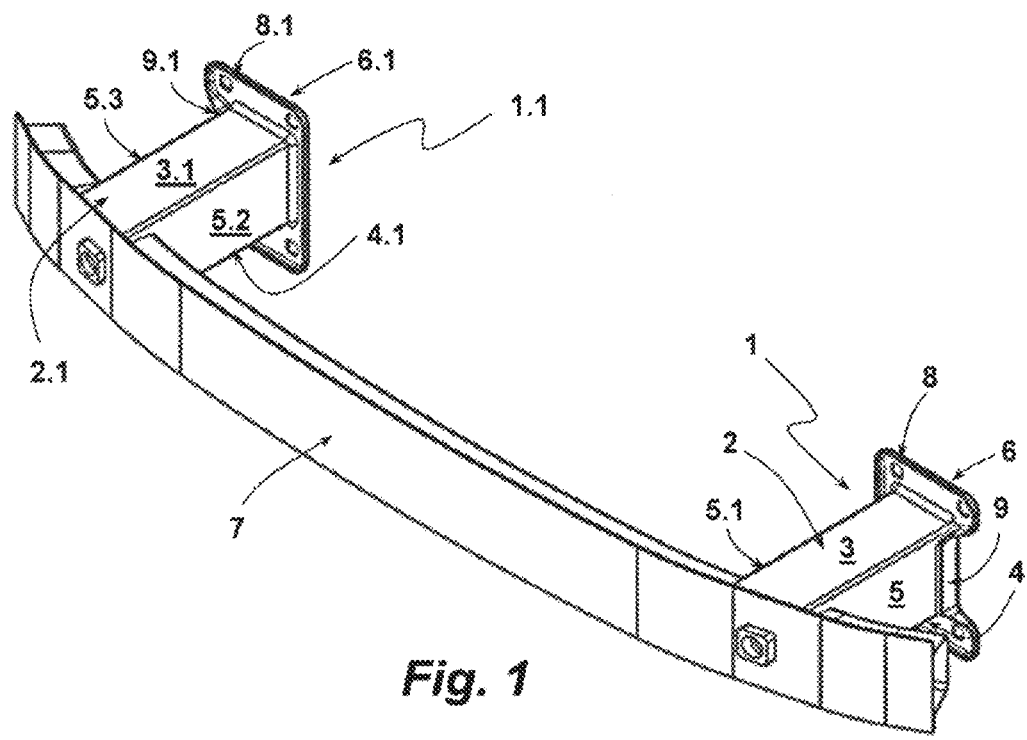
FIG. 1 shows a perspective view of a bumper crossmember with two energy absorption components according to the present disclosure.

Shown in FIG. 1 are two energy absorption components 1, 1.1 according to the present disclosure, each comprising, respectively, a crash box 2, 2.1 with a top chord 3, 3.1, a bottom chord 4, 4.1, and two side chords 5, 5.1, 5.2, 5.3 connecting the top chord 3, 3.1 to the bottom chord 4, 4.1, and a mounting plate 6, 6.1 connected thereto. The crash boxes 2, 2.1 here are produced as extruded profile parts made of a suitable aluminum alloy. The energy absorption components 1, 1.1 are implemented mirror symmetrically with respect to the plane running parallel to the respective side chords 5, 5.1, 5.2, 5.3 through the center of the bumper crossmember 7. While one front side end of the crash box 2, 2.1 is notched in the region of its side chords 5, 5.1, 5.2, 5.3 for the connection to the bumper crossmember 7 and is connected to the bumper crossmember 7, the other front side end of the crash box 2, 2.1 rests against the mounting plate 6, 6.1 and is welded to it. 4 flange 8, 8.1 of the mounting plate 6, 6.1, which is bent in the direction of the crash box 2, 2.1, forms the margin of the plate and, in the region of the respective outer side chord 5, 5.3 of the crash box 2, 2.1, is brought by a flange portion 9, 9.1 up to the outer side of the side chord 5, 5.3, The flange portion 9, 9.1 rests by its flange inner side flat against the outer side of the side chord 5, 5.3. The flange portion 9, 9.1 is in each case connected to the respective side chord 5, 5.3 by a welded joint implemented as fillet weld in the represented embodiment example.

The energy absorption component 1 is described below in further detail in reference to FIG. 2. The following descriptions apply likewise to the energy absorption component 1.1. The connection of the crash box 2 to the mounting plate 6 has been carried out in the region of the end of the top chord 3 facing the mounting plate 6 by means of a fillet weld 10. In this energy absorption component 1, it is essential that the peripheral flange 8 of the mounting plate 6 is brought by a flange portion 9 up to the outer side chord 5 of the crash box 2, which is particularly stressed in the event of a crash. The front surface 12 of the flange portion 9, which faces the bumper crossmember side end of the crash box 2, is welded by means of a fillet weld 13 to the outer side of the side chord 5. Via the flange portion 9, the fillet weld 13 is spaced apart in the direction of the longitudinal extent of the crash box 2 from the web weld 10 which connects the top chord 3 to the mounting plate 6. In addition, the flange portion 9 represents a support for the crash box 2. The bottom chord 4 is connected on the front side to the mounting plate 6 exactly like the top chord 3, The fillet weld 13, which connects the flange portion 9 to the side chord 5, does not extend beyond the edges 11 of the crash box 2, via which the side chord 5 is connected to the top chord 3 and to the bottom chord 4. The fillet weld 13 ends before the edges 11. As a result, during the welding, excessive heat input into the edge region is avoided.

Figure 2:
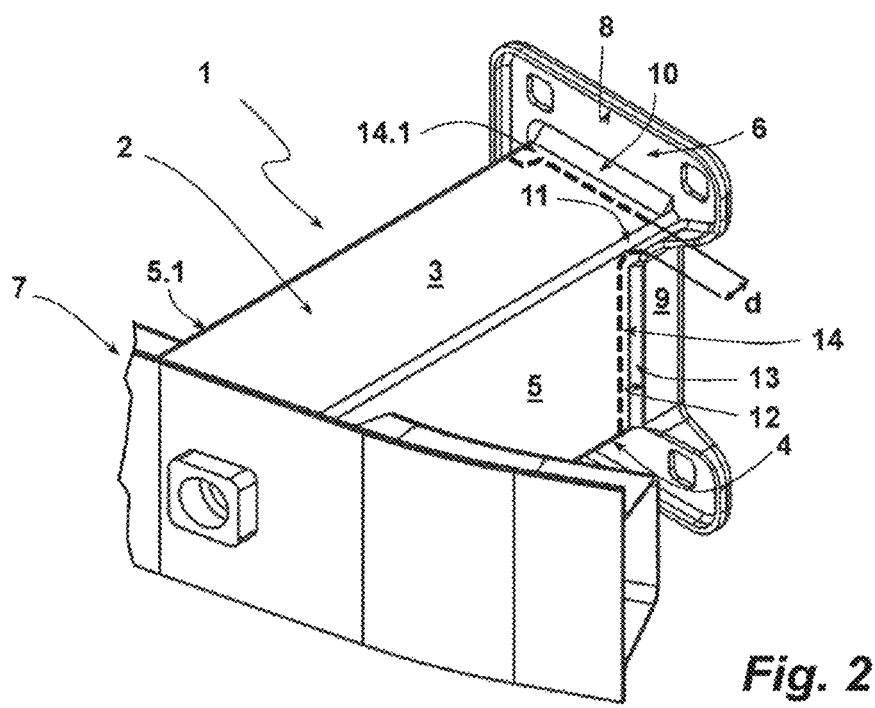
FIG. 2 shows an enlarged partial view of the bumper crossmember of FIG. 1 in the region of its energy absorption component arranged at the right end.

In FIG. 2, the heat influence zones introduced through the respective weld for producing the web weld 10 or the fillet weld 13 implemented as edge weld into the respective chord 3 or 5 are drawn with broken lines, wherein in said zones the mechanical strength properties of the crash box 2 are reduced due to the heat input. In the representation of FIG. 2, it can be clearly seen that the two regions 14, 14.1 having reduced strength due to the heat input do not transition into one another but are spaced apart from one another with a spacing d. This representation makes it clear that no peripheral zone of reduced strength is present in the energy absorption component 1 when the crash box 2 is connected to the mounting plate 6. The offset of the welds of top chord 3 and bottom chord 4 to the mounting plate 6 on the one hand and of the connection between the side chord 5 and the flange portion 9 of the mounting plate 6 on the other hand, which offset is provided by a spacing with spacing d in longitudinal extent of the crash box 2, is the reason for the particular stability of the energy absorption component 1, particularly when tensile forces act on the outer side chord 5 in the case of a crash. Correspondingly, the crash performance of the energy absorption component 1 and thus of the bumper crossmember 7 equipped with the energy absorption components 1, 1.1 is considerably improved in comparison to conventional energy absorption components.

Figure 3A:
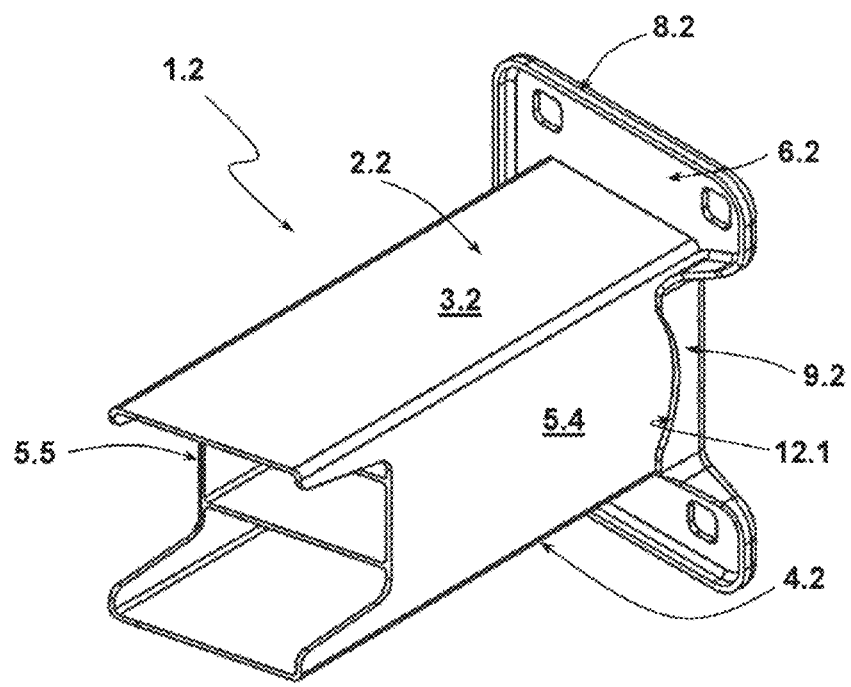
FIG. 3a shows a perspective view of another energy absorption component according to the present disclosure with its crash box not yet welded to a mounting plate.
Figure 3B:
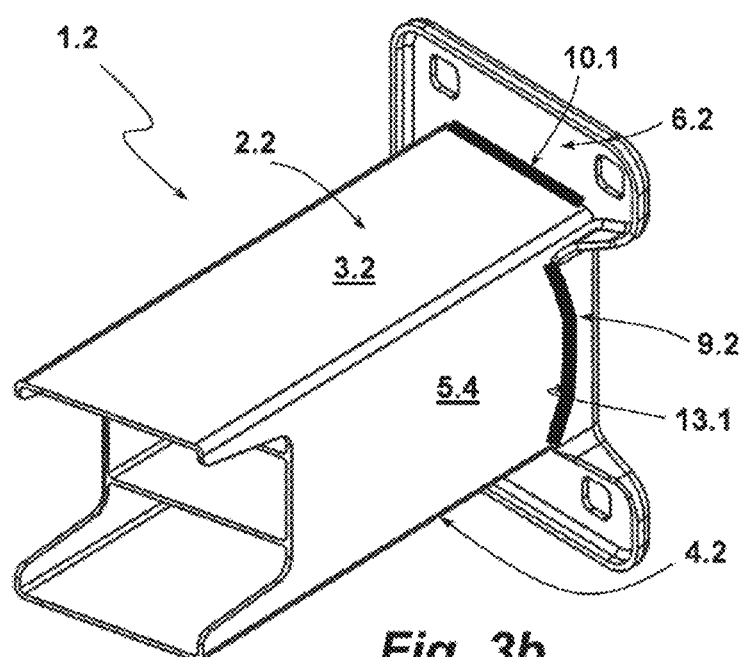
FIG. 3b shows the energy absorption component of FIG. 3a with the crash box welded to the mounting plate.

In FIG. 3*a*, an additional embodiment is shown, in which the front side 12.1 of the flange portion 9.2 brought up to the outer side chord 5.4 has a concave curvature. Due to the concave curvature of the front side 12.1, the weld implemented thereon as fillet weld 13.1 is correspondingly longer. Moreover, due to this form, the stiffness discontinuity is reduced, in that the stiffness in the mounting plate 6.2 is increased by the curved flange portion 9.2. FIG. 3*b* shows the components—crash box 2.2 and mounting plate 6.2—which are not yet connected to one another in FIG. 3*a*, with welds 10.1, 13.1 as indicated.

Figure 4A:
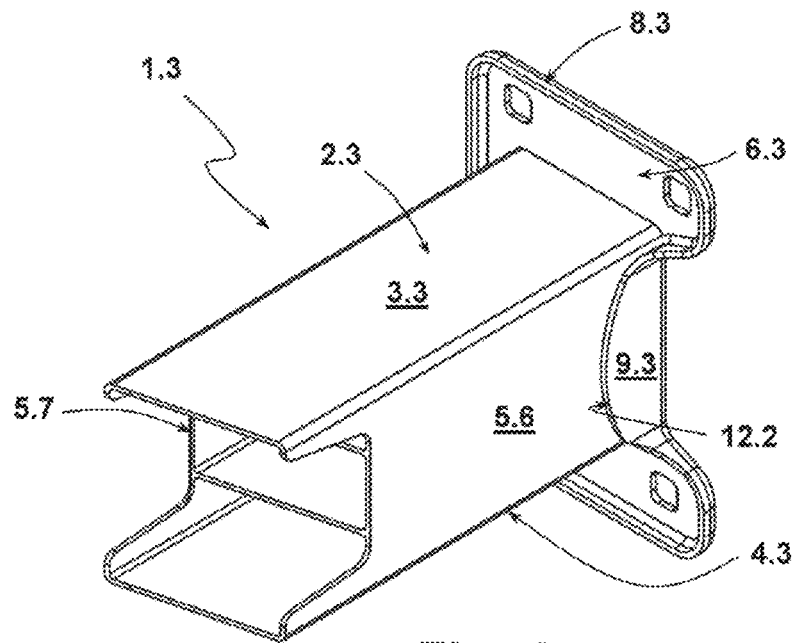
FIG. 4a shows a perspective view of another energy absorption component according to the present disclosure with its crash box not yet welded to a mounting plate.
Figure 4B:
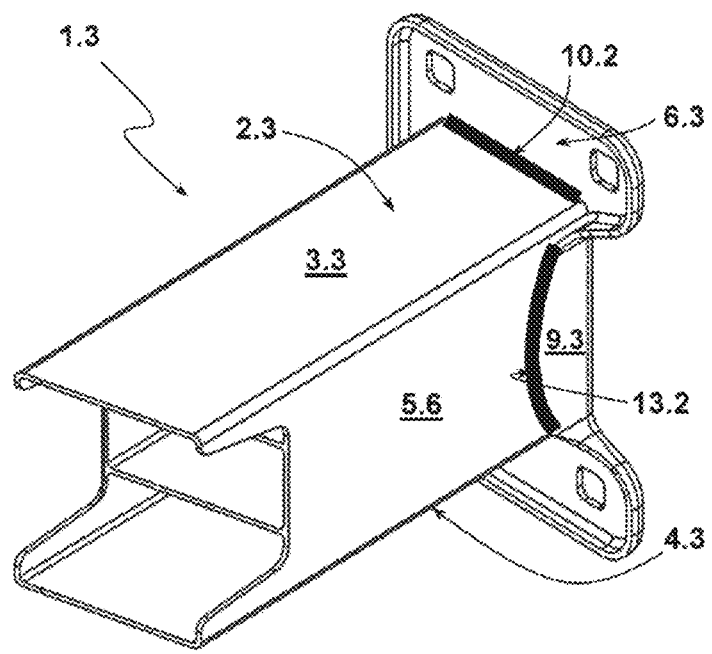
FIG. 4b shows the energy absorption component of FIG. 4a with the crash box welded to the mounting plate.

The embodiment example of FIG. 4*a* is similar to that of FIG. 3*a* and differs therefrom only in that the front side 12.2 of the flange portion 9.3 is implemented with convex curvature in the direction of the bumper crossmember connection side end of the crash box 2.3. Moreover, as a result of this form, the stiffness transition and thus the stress curve under load are adjusted. This means, in concrete terms, that a punctual stress is avoided, and, instead, the stress peak is distributed evenly over the flange portion 9.3 due to the curvature. As a result, it is possible to transfer or absorb overall higher forces. FIG. 4*a* shows the crash box 2.3 not yet connected by welding to the mounting plate 6.3. In FIG. 4*b*, the welds 10.2, 13.2 are identified, by means of which the two components are connected to one another.

Figure 5A:
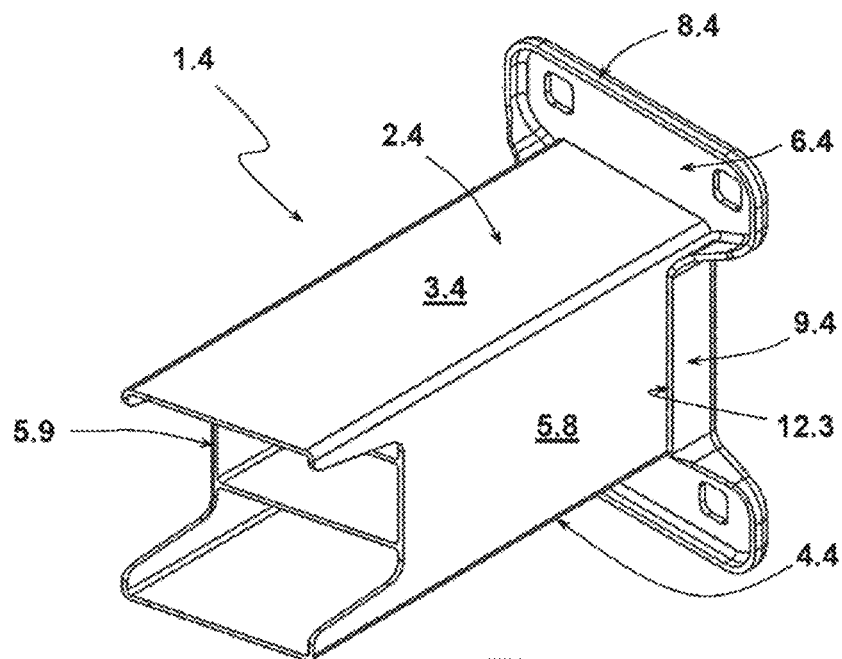
FIG. 5a shows a perspective view of another energy absorption component according to the present disclosure with its crash box not yet welded to a mounting plate.

FIG. 5*a* shows a development of the energy absorption component 1. In the energy absorption component 1.4 of FIG. 5*a*, the two side chords 5.8, 5.9 are connected to the mounting plate 6.4 via a respective flange portion 9.4, 9.5 brought up to and resting against the respective outer side. FIG. 5*a* shows the energy absorption component 1.4 still without welded joints.

Figure 5B:
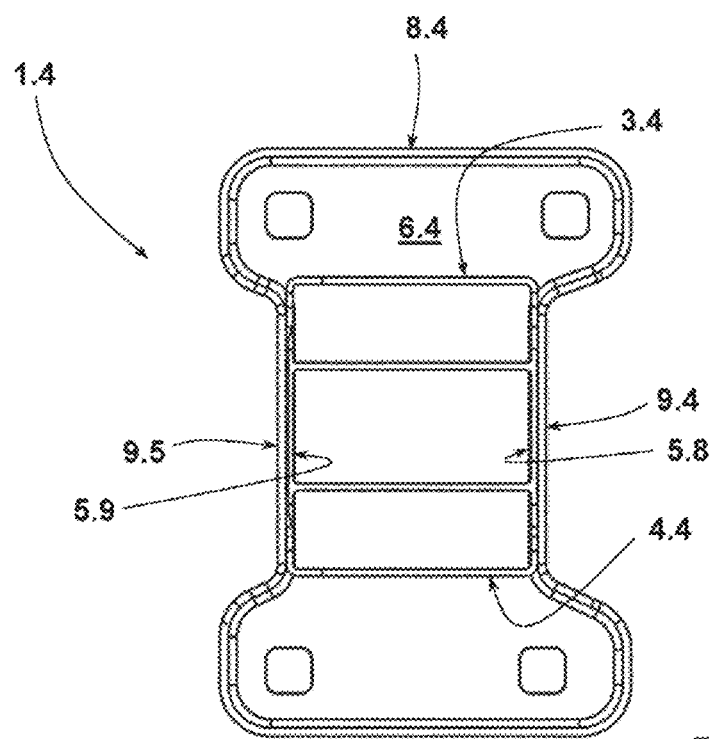
FIG. 5b shows a front view of the energy absorption component of FIG. 5a, and FIG. 6 shows a perspective view of an energy absorption component according to the prior art.

The geometry of the mounting plate 6.4 can be seen from the front view of the energy absorption component 1.4 of FIG. 5*b*. Since the mounting plate 6.4 has two flange portions 9.4, 9.5 which are opposite another, the geometry of the mounting plate 6.4 is approximately I-shaped. The narrowing on the outer side chord 5.8 side is greater than the narrowing on the inner side chord 5.9 side. As a result, it can be seen that the height of the flange portion 9.4—according to its extent in the direction of the longitudinal extent of the crash box 2.4—is greater than the height of the flange portion 9.5.

Figure 6:
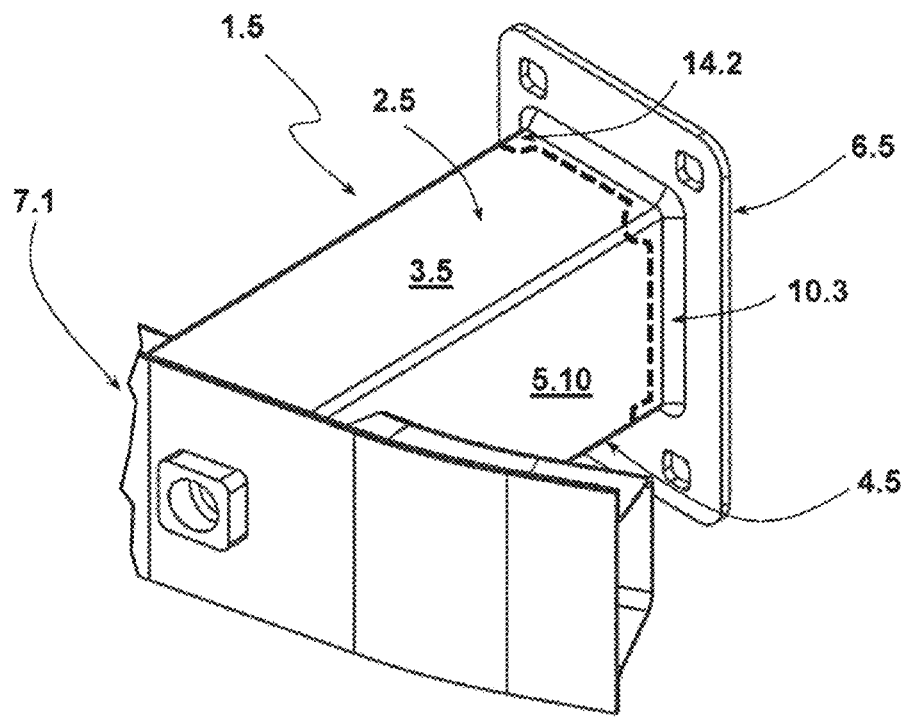

In FIG. 6, a previously known energy absorption component 1.5 is shown, in which the front side of the crash box 2.5 is connected to the mounting plate 6.5 via a peripheral web weld 10.1 led over the edges. By means of the connection, which is considered to be necessarily implemented peripherally, larger regions with reduced strength 14.2 form in the four edge regions of the crash box 2.5, as diagrammatically represented in FIG. 6 by a broken line. In contrast to the example energy absorption components 1, 1.1, 1.2, 1.3, 1.4 according to the present disclosure, in this previously known energy absorption component 1.5, cracking in the case of a frontal crash is often observed on the external side chord 2.10, proceeding from the regions 14.2 of the crash box 2.5 which exhibit lower strength. This can even lead to partial tearing off of the crash box 2.5 from the mounting plate 6.5, so that the energy absorption according to the intended use is no longer ensured.

The invention has been described in reference to embodiment examples. Without departing the scope of the claims, numerous additional embodiments, modifications and possibilities arise for a person skilled in the art for carrying out the subject matter of the invention, without these having to be explained or shown in further detail in the context of this disclosure.

LIST OF REFERENCE NUMERALS

1, 1.1-1.5 Energy absorption component
2, 2.1-2.5 Crash box
3, 3.1-3.5 Top chord
4, 4.1-4.5 Bottom chord
5, 5.1-5.5 Side chord
6, 6.1-6.5 Mounting plate
7, 7.1 Bumper crossmember
8, 8.1-8.4 Flange
9, 9.1-9.5 Flange portion
10, 10.1-10.3 Web weld
11 Edge
12.1, 12.2, 12.3 Front side
13, 13.1, 13.2 Fillet weld
14, 14.1, 14.2 Region with reduced strength

The invention claimed is:

1. An energy absorption component for a motor vehicle, comprising:
   a mounting plate for connection of the energy absorption component to a longitudinal member, and
   a crash box formed by a top chord, a bottom chord, and two side chords spaced apart from one another which connect the top chord to the bottom chord, wherein a first end of the crash box is designed for connection to a bumper crossmember, and a second end of the crash box rests against and is welded to the mounting plate,
   wherein the mounting plate has a peripheral flange bent in a direction of the first end of the crash box, with at least one flange portion which rests against a respective side chord of the crash box and is connected thereto by a welded joint, wherein this welded joint is spaced apart from adjacent welded joints, which connect the mounting plate to the top and bottom chords of the crash box, in a direction of a longitudinal extent of the crash box,
   wherein the flange portion connected to the side chord transitions into adjacent flange portions that are not resting against the side chord, and the flange portion has a greater extent in the direction of the longitudinal extent of the crash box than the adjacent flange portions not resting against the side chord.

2. The energy absorption component of claim 1, wherein the welded joint connecting the flange portion to the side chord is spaced apart in the direction of the longitudinal extent of the crash box from the adjacent welded joints between the mounting plate and the top and bottom chords, such that heat influence zones with reduced mechanical strength properties introduced into the crash box through welding are spaced apart from one another.

3. The energy absorption component of claim 1, wherein the welded joint on the at least one side chord is implemented as a fillet weld between the side chord and a front side of the flange portion which faces the direction of the first end of the crash box.

4. The energy absorption component of claim 3, wherein the side chords transition into the top and bottom chords through edges of the crash box, and the fillet weld extends into regions of the edges of the crash box but ends before the edges.

5. The energy absorption component of claim 1, wherein the side chord welded to the flange portion, in transverse direction, faces away from a middle section of the bumper cross member to which the energy absorption component is connected, thus forming an outer side chord of the crash box.

6. The energy absorption component of claim 1, wherein an inner side of the at least one flange portion rests against an outer side of the respective side chord.

7. The energy absorption component of claim 6, wherein a front side of the flange portion facing the direction of the first end of the crash box is curved in its course extending on the side chord.

8. The energy absorption component of claim 1, wherein all welds are laser welds, MIG welds, or a combination of different welds.

9. The energy absorption component of claim 1, wherein the crash box is produced from an aluminum alloy.

10. The energy absorption component of claim 9, wherein the crash box is produced by an extrusion method.

11. The energy absorption component of claim 1, wherein the mounting plate has two flange portions opposite one another, each flange portion connected by a welded joint to a respective side chord, and both welded joints are spaced apart from the adjacent welded joints, which connect the mounting plate to the top and bottom cords of the crash box, in the direction of the longitudinal extent of the crash box.

12. A bumper crossmember for a motor vehicle, comprising at least one energy absorption component according to claim 1, wherein each energy absorption component of the at least one energy absorption component connects the bumper crossmember to a respective longitudinal side member of the motor vehicle.

* * * * *